United States Patent
Fischer et al.

[15] 3,671,586
[45] June 20, 1972

[54] N-PHENYL-N'-ESTER UREA DERIVATIVES

[72] Inventors: Adolf Fischer, Mutterstadt/Pfalz; Karl-Heinz Koenig, Ludwigshafen/Rhine; Gustav Steinbrunn, Schwegenheim/Pfalz; Albrecht Zschocke, Bad Duerkheim, all of Germany

[73] Assignee: Badische Anilin- & Soda-Fabrik Aktiengesellschaft, Ludwigshafen/Rhine, Germany

[22] Filed: June 23, 1970

[21] Appl. No.: 49,159

Related U.S. Application Data

[62] Division of Ser. No. 652,034, July 10, 1967, Pat. No. 3,621,055.

[52] U.S. Cl. ..........................260/545 R, 71/103, 71/105, 71/113, 71/120, 260/465 D
[51] Int. Cl. .................................................C07c 127/22
[58] Field of Search ...................................260/545 R, 465 D

[56] References Cited

FOREIGN PATENTS OR APPLICATIONS 182,729    6/1966    U.S.S.R. ...............................260/545

*Primary Examiner*—Lorraine A. Weinberger
*Assistant Examiner*—Robert Gerstl
*Attorney*—Johnston, Root, O'Keeffe, Keil, Thompson & Shurtleff

[57] ABSTRACT

Phenyl urea derivatives having the formula

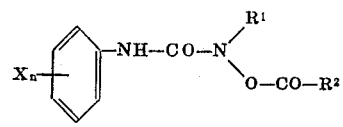

wherein X, $n$, $R^1$ and $R^2$ have the meanings designated below, and method for controlling unwanted plant growth.

7 Claims, No Drawings

N-PHENYL-N'-ESTER UREA DERIVATIVES

This application is a division of our copending application Ser. No. 652,034, filed July 10, 1967 issued on Nov. 16, 1971 as U.S. Pat. No. 3,621,055.

The present invention relates to urea derivatives, in particular phenylurea derivatives containing ester groups, and to methods of controlling undesirable plant growth with these compounds.

It is known that trisubstituted areas, e.g., N-p-chlorophenyl-N'-N'-dimethylurea and N-4-chlorophenyl-N'-methyl-N'-methoxyurea, may be used as the active ingredients of herbicides. However their herbicidal action is not completely satisfactory.

An object of the invention is to provide new phenylurea derivatives. Another object of the invention is to provide valuable new phenylurea derivatives containing carboxy groups. A further object of the invention is to provide valuable new phenylurea derivatives containing ester groups. Yet another object of the invention is to provide a method of controlling unwanted plant growth without injuring crop plants and a method for controlling all plants over a specific area.

These and other objects of the invention are achieved with compounds having the formula

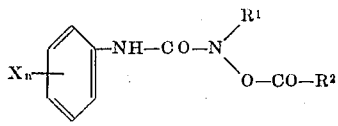

in which X denotes halogen or a nitro, cyano, trifluoromethyl, methylsulfonyl, lower alkyl or lower alkoxy group (methoxy) or a phenoxy group which may be substituted by chlorine, the X radicals being identical or different and n denotes one of the integers 0 to 3, $R^1$ denotes hydrogen, a lower aliphatic radical which may be substituted by chlorine or a cycloalkyl radical which may be substituted by methyl, and $R^2$ denotes an aliphatic radical which may be substituted by halogen or methoxy or a phenoxymethyl radical which may be substituted by chlorine or methyl or a benzyl or phenyl radical which may be substituted by halogen or a cyclopropyl radical. These compounds have a good herbicidal action on broadleaved and grass weeds, are well tolerated by and have no injurious after-effect on cereals, Indian corn and rice and have a rapid onset of action.

These compounds are suitable for controlling unwanted plants growing among crops without injuring the crops. Furthermore they have short residual action so that after the crop plants have been harvested new plants can be sown without suffering any injury.

By salts we mean alkali metal salts or alkaline earth metal salts, e.g., the sodium, potassium, magnesium or calcium salts, or the ammonium salts or the salts of amines, e.g., of dimethylamine, triethylamine, triethanolamine or ethanolamine.

The active ingredients may be prepared by conventional methods by reacting substituted N-phenyl-N'-hydroxyureas with acid halides in the presence of alkaline reagents; the N-phenyl-N'-hydroxyureas may be prepared for example from the corresponding isocyanates and substituted hydroxylamines.

The following descriptions illustrate how the new substituted urea derivatives are prepared (parts specified are parts by weight unless otherwise stated).

N-3,4-dichlorophenyl-N'-methyl-N'-(dichlorophenoxyaceto)-hydroxyurea of the formula

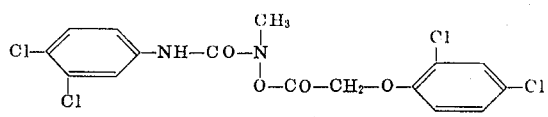

12 parts of 2,4-dichlorophenoxyacetic chloride dissolved in 10 parts of toluene is dripped while stirring at 20° to 30° C. into a solution of 12 parts of N-3,4-dichlorophenyl-N'-methyl-N'-hydroxyurea, 75 parts of toluene and 5.2 parts of triethylamine. The reaction mixture is then kept between 40° and 50° C. for some hours. After cooling, the mixture is washed with water, dried and freed of solvent in vacuo. The crystalline residue is recrystallized from a mixture of toluene and petroleum ether, 21 parts of N-3,4-dichlorophenyl-N'-methyl-N'-(2,4-dichlorophenoxyaceto)-hydroxyurea is obtained with a melting point of 115° to 117° C.; chlorine found: 32.4 percent, calc.: 32.4 percent.

The other active ingredients according to the invention may be prepared by analogous methods. Depending on the acid halide used, the temperature of the esterification may be between —20° and +100° C., preferably however between 0° and 70° C.

The following substituted N'-hydroxyureas are examples of suitable starting materials in the production of the compounds according to the invention:

N-3,4-dichlorophenyl-N'-methyl-N'-hydroxyurea
N-3-chlorophenyl-N'-methyl-N'-hydroxyurea
N-4-chlorophenyl-N'-methyl-N'-hydroxyurea
N-3,4-dichlorophenyl-N'-isopropyl-N'-hydroxyurea
N-3-chlorophenyl-N'-isopropyl-N'-hydroxyurea
N-3-trifluoromethylphenyl-N'-methyl-N'-hydroxyurea
N-3-nitrophenyl-N'-methyl-N'-hydroxyurea
N-phenyl-N'-ethyl-N'-hydroxyurea
N-3-tolyl-N'-methyl-N'-hydroxyurea
N-4-(4'-chlorophenoxy)-phenyl-N'-methyl-N'-hydroxyurea.

The following substances are examples of active ingredients according to this invention:

| X | n | $R^1$ | Z | $R^2$ | M.P., ° C. |
|---|---|---|---|---|---|
| 4-Br | 1 | —CH₃ | —CO— | —CH(CH₂)(CH₂) (cyclopropyl) | 92–94 |
| 4-Cl | 1 | —CH(CH₃)₂ | —CO— | —C₆H₅ (phenyl) | 150–151 |
| 3-NO₂ | 1 | —CH₃ | —CO— | —CH(CH₃)₂ | 78–80 |
| 3,4-Cl | 2 | —CH₃ | —CO— | —CH(C₂H₅)—(CH₂)₃—CH₃ | 63–65 |
| 4-Br | 1 | —CH₃ | —CO— | —C(CH₃)=CH₂ | 80–82 |

| X | n | R¹ | Z | R² | M.P., °C. |
|---|---|---|---|---|---|
| 3,4-Cl | 2 | —CH₃ | —CO— | —C(CH₃)(CH₃)—CH₂Br | 92–94 |
| 4-Br | 1 | —CH₃ | —CO— | —CH(CH₃)CH₃ | 65–67 |
| 3,4-Cl | 2 | —CH₃ | —CO— | —CH(CH₃)CH₃ | (a) |
| 3,4-Cl | 2 | —CH₃ | —CO— | —C(Cl)(CH₃)—C₂H₅ | (b) |
| 3-CH₃ | 1 | —CH₃ | —CO— | —CH(CH₃)CH₃ | 80 |
| 2-CH₃, 4-CH₃ | 2 | —CH₃ | —CO— | —CH₃ | 76 |
| 2-CH₃, 4-Cl | 2 | —CH₃ | —CO— | —CH₃ | 92 |
| 2-CH₃, 4-Cl | 2 | —CH₃ | —CO— | —CH(CH₃)CH₃ | 63 |
| 2-CH₃, 5-Cl | 2 | —CH₃ | —CO— | —CH(CH₃)CH₃ | 73 |
| 3-Cl, 4-CH₃ | 2 | —CH₃ | —CO— | —CH₃ | 62 |
| 3-Cl, 4-CH₃ | 2 | —CH₃ | —CO— | —CH(CH₃)CH₃ | 57 |
| 4-Cl | 1 | —CH₃ | —CO— | —CH(CH₃)CH₃ | 63 |
| 4-Cl | 1 | —CH₃ | —CO— | —C(CH₃)(CH₃)CH₃ | 70 |
| 3-Cl | 1 | —CH₃ | —CO— | —CH₃ | (c) |
| 3-Cl | 1 | —CH₃ | —CO— | —CH(CH₃)CH₃ | 61 |
| 3-Cl | 1 | —CH₃ | —CO— | —CH=C(CH₂)(CH₃) | 110 |
| 3-Cl | 1 | —CH₃ | —CO— | —CH=CH—CH₃ | (d) |
| 3-Cl | 1 | —CH₃ | —CO— | —C(CH₃)=CH₂ | 35 |
| 3-Cl | 1 | —CH₃ | —CO— | —C(CH₃)(CH₃)CH₃ | 56 |
| 3,4-Cl | 2 | —CH₃ | —CO— | —CH₂CH₃ | 72 |
| 3,4-Cl | 2 | —CH₃ | —CO— | —CH₂Cl | 74 |
| 3,4-Cl | 2 | —CH₃ | —CO— | —CH₂CH₂CH₃ | 76 |
| 3,4-Cl | 2 | —CH₃ | —CO— | —C(CH₃)=CH₂ | 100 |
| 3,4-Cl | 2 | —CH₃ | —CO— | —CH₂—CH=CH₂ | 96 |
| 3,4-Cl | 2 | —CH₃ | —CO— | —CH=CH—CH₃ | 99 |
| 3,4-Cl | 2 | —CH₃ | —CO— | —(CH₂)₅Cl | 66 |
| 3,4-Cl | 2 | —CH₃ | —CO— | —C(CH₃)(CH₃)CH₃ | (e) |

| X | n | R¹ | Z | R² | M.P., °C. |
|---|---|---|---|---|---|
| 3,4-Cl | 2 | —CH₃ | —CO— | —CH₂—C(CH₃)₂—CH₃ (with CH₃) | 115 |
| 3,4-Cl | 2 | —CH₃ | —CO— | —CH₂—O—C₆H₅ | 111 |
| 4-Br | 1 | —CH₃ | —CO— | —CH₂—CH₃ | 60 |
| 4-Br | 1 | —CH₃ | —CO— | —CH=C(CH₃)₂ | 132 |

ªB.P.$_{0.5}$=77–80° C.  ᵇB.P.$_{0.5}$=102–104° C.  ᶜB.P.$_{0.1}$=65° C.  ᵈB.P.$_{0.3}$=85° C.  ᵉB.P.$_{0.1}$=95° C.

The agents according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points, such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water or by mixing the salts with water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent. The active ingredients may also be applied as granulates.

The active ingredients may be mixed with insecticides, fungicides, bactericides and other herbicides as well as with fertilizers.

Dusts may be prepared by mixing or grinding the active ingredients with a solid carrier.

The following Examples illustrate the application of the active ingredients according to this invention.

EXAMPLE 1

In a green house plastic pots having a diameter of 8 cm were filled with loamy sandy soil and seeds of cotton (*Gossypium* spp.), Indian corn (*Zea mays*), barley (*Hordeum vulgare*), wheat (*Triticum vulgare*), wild mustard (*Sinapis arvensis*), white goosefoot (*Chenopodium album*), small nettle (*Urtica urens*), chickweed (*Stellaria media*), gallant soldier (*Galinsoga parviflora*), annual meadow grass (*Poa annua*) and slender foxtail (*Alopecurus mysosuroides*) were sown therein. The soil thus prepared was then treated with N-3,4-dichlorophenyl-N'-methyl-N'-(dimethylcarbamoyl)-hydroxyurea (I), N-3,4-dichlorophenyl-N'-methyl-N'-(2,4-dichlorophenoxyaceto)-hydroxyurea (II) and, for comparison, with N-p-chlorophenyl-N',N'-dimethylurea (III), each at a rate of 3 kg of active ingredient per hectare dispersed in 500 liters of water. After 3 to 4 weeks it was observed that compounds I and II had about as good a herbicidal action as III, but they were better tolerated by cotton, Indian corn, barley and wheat. The results of the experiment can be seen from the following Table.

|  | Active ingredient | | |
|---|---|---|---|
|  | I | II | III |
| Crop plants |  |  |  |
| Cotton | 0 | 0 | 10–20 |
| Indian corn | 0 | 0 | 20 |
| Barley | 10 | 5 | 30–40 |
| Wheat | 5 | 0–5 | 40–50 |
| Unwanted plants |  |  |  |
| Wild mustard | 90–100 | 90–100 | 100 |
| White goosefoot | 90–100 | 90–100 | 90–100 |
| Small nettle | 100 | 100 | 100 |
| Chickweed | 90–100 | 90–100 | 90–100 |
| Gallant soldier | 90–100 | 90–100 | 90–100 |
| Annual meadow grass | 90 | 85–90 | 90 |
| Slender foxtail | 80–90 | 80–90 | 80–90 |

0 = no injury
100 = complete kill

The following compounds have the same biological activity as active ingredients I and II in Examples 1 and 2:
N-3,4-dichlorophenyl-N'-methyl-N'-(cyclopropanoyl)-hydroxyurea
N-4-bromophenyl-N'-methyl-N'-(isobutyryl)-hydroxyurea
N-4-cyanophenyl-N'-methyl-N'-(3,3-dichloroacryloyl)-hydroxyurea
N-3-chloro-4-methylphenyl-N'-methyl-N'-(methacryloyl)-hydroxyurea
N-3-nitrophenyl-N'-methyl-N'-(isobutyryl)-hydroxyurea
N-3,4-dichlorophenyl-N'-methyl-N'-(2,4-dichlorobenzoyl)-hydroxyurea.

EXAMPLE 2

In a greenhouse the plants Indian corn (*Zea mays*), barley (*Hordeum vulgare*), wheat (*Triticum vulgare*), rye (*Secale cereale*), wild mustard (*Sinapis arvensis*), white goosefoot (*Chenopodium album*), small nettle, (*Urtica urens*), bur marigold (*Bidons pilosa*), summer cypress (*Kochia scoparia*), wild oats (*Avena fatua*), annual meadow grass (*Poa annua*) and slender foxtail (*Alopecurus mysosuroides*) were treated at a growth height of 4 to 17 cm with N-3,4-dichlorophenyl-N'-methyl-N'-(dimethylcarbamoyl)-hydroxyurea (I), N-3,4-dichlorophenyl-N'-methyl-N'-(2,4-dichlorophenoxyaceto)-hydroxyurea (II), N-3,4-dichlorophenyl-N'-methyl-N'-(isobutyryl)-hydroxyurea (III), N-3,4-dichlorophenyl-N'-methyl-N'-(2-chloro-2-methylbutanoyl)-hydroxyurea (IV) and, for comparison, with N-p-chlorophenyl-N', N'-dimethylurea (V), each at a rate of 3 kg of active ingredient per hectare dispersed in 500 liters of water. After 3 to 4 weeks it was observed that compounds I, II, III and IV had a stronger herbicidal action than V and were better tolerated by Indian corn, barley, wheat and rye. The results of the experiment can be seen from the following Table.

|  | Active ingredient | | | | |
|---|---|---|---|---|---|
|  | I | II | III | IV | V |
| Crop plants |  |  |  |  |  |
| Indian corn | 10 | 10 | 0–10 | 10–15 | 20–30 |
| Barley | 10 | 5–10 | 0–10 | 10 | 70 |
| Wheat | 0 | 10 | 0 | 10 | 90 |
| Rye | 10 | 5–10 | 0–10 | 10 | 80 |
| Unwanted plants |  |  |  |  |  |
| Wild mustard | 100 | 100 | 100 | 100 | 100 |
| White goosefoot | 100 | 100 | 100 | 100 | 90–100 |
| Small nettle | 100 | 100 | 100 | 100 | 100 |
| Bur marigold | 90–100 | 90 | 90–100 | 90–100 | 90 |
| Summer cypress | 100 | 90 | 90–100 | 90 | 80 |
| Wild Oats | 90–100 | 90 | 90–100 | 90 | 80 |
| Annual meadow grass | 90–100 | 90 | 100 | 90–100 | 80–90 |
| Slender foxtail | 90–100 | 90 | 100 | 90–100 | 80–90 |

0 = no injury
100 = complete kill

EXAMPLE 3

A cultivated plot which was overgrown with wild mustard (*Sinapis arvensis*), white goosefoot (*Chenopodium album*), small nettle (*Urtica urens*), chickweed (*Stellaria media*), gallant soldier (*Galinsoga parviflora*), annual meadow grass (*Poa annua*) and slender foxtail (*Alopecurus myosuroides*) was treated at a growth height of the weeds of 3 to 8 cm with N-3,4-dichlorophenyl-N'-methyl-N'-(2,4-dichlorophenoxyaceto)-hydroxyurea (I) and, for comparison, with N-p-chlorophenyl-N',N'-dimethylurea (II), each at a rate of 5 kg of active ingredient per hectare dispersed in 500 liters of water. After a few days it could be observed that compound I had a stronger herbicidal action on the broadleaved and grass weeds than II. After 3 weeks almost all the plants were completely withered.

The following compounds have the same biological action as the active ingredients I in Example 3:
N-3,4-dichlorophenyl-N'-methyl-N'-(isobutyryl)-hydroxyurea
N-3,4-dichlorophenyl-N'-methyl-N'-(2-chloro-2-methylbutanoyl)-hydroxyurea
N-4-methoxyphenyl-N'-methyl-N'-(2,2-dichlorobutyryl)-hydroxyurea
N-3,4-dichlorophenyl-N'-methyl-N'-(2-methyl-2-bromomethylpropionyl)-hydroxyurea
N-4-bromophenyl-N'-methyl-N'-(3,4-dichlorophenylaceto)-hydroxyurea
N-3,4-dichlorophenyl-N'-methyl-N'-(2-methyl-4-chlorophenoxyaceto)-hydroxyurea
N-4-fluorophenyl-N'-methyl-N'-(2-methyl-2-methoxypropionyl)-hydroxyurea
N-4-chlorophenyl-N'-(isobutyryl)-hydroxyurea.

The invention is hereby claimed as follows:

1. A compound having the formula

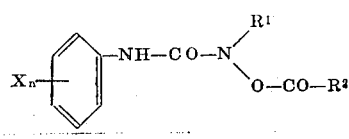

in which X denotes chloro, bromo, fluoro, trifluoromethyl, nitro, lower alkyl, lower alkoxy, phenoxy, chlorophenoxy, or cyano, the X radicals being identical or different, n denotes 0, 1, or 2, R¹ denotes hydrogen or lower alkyl, and R² lower alkyl, lower alkenyl, bromo-substituted lower alkyl, chloro-substituted lower alkyl, chloro-substituted lower alkenyl, methoxy-substituted lower alkyl, phenoxymethyl, chloro-substituted phenoxymethyl, benzyl, chloro-substituted benzyl, phenyl, chloro-substituted phenyl or cyclopropyl.

2. A compound as claimed in claim 1 wherein R¹ is methyl and R² is lower alkyl.

3. A compound as claimed in claim 1 wherein R¹ is methyl and R² is lower alkenyl.

4. N-3,4-dichlorophenyl-N'-methyl-N'-(2,4-dichlorophenoxyaceto)-hydroxyurea.

5. N-3,4-dichlorophenyl-N'-methyl-N'-(isobutyryl)-hydroxyurea.

6. N-3,4-dichlorophenyl-N'-methyl-N'-(2-chloro-2-methylbutanoyl)-hydroxyurea.

7. A compound as claimed in claim 1 wherein R¹ is lower alkyl.

* * * * *